(12) United States Patent
Kade et al.

(10) Patent No.: US 7,400,236 B2
(45) Date of Patent: Jul. 15, 2008

(54) VEHICULAR LANE MONITORING SYSTEM UTILIZING FRONT AND REAR CAMERAS

(75) Inventors: Alexander Kade, Grosse Pointe Woods, MI (US); Alan W. Finch, Troy, MI (US); Kent S. Lybecker, St. Clair Shores, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 287 days.

(21) Appl. No.: 11/255,748

(22) Filed: Oct. 21, 2005

(65) Prior Publication Data

US 2007/0091173 A1    Apr. 26, 2007

(51) Int. Cl.
   *B60Q 1/22* (2006.01)
(52) U.S. Cl. ............ 340/463; 340/937; 340/938; 701/41; 701/301
(58) Field of Classification Search .......... 340/436, 340/435, 901, 904, 937, 938; 701/1, 41, 701/96, 301
   See application file for complete search history.

(56) References Cited

U.S. PATENT DOCUMENTS

| | | | |
|---|---|---|---|
| 4,507,312 A | 3/1985 | Suh et al. | |
| 4,549,992 A | 10/1985 | Suh et al. | |
| 5,508,272 A | 4/1996 | Robl | |
| 6,489,887 B2 | 12/2002 | Satoh et al. | 340/436 |
| 6,777,443 B2 | 8/2004 | Fink | |
| 6,792,345 B2 * | 9/2004 | Matsumoto et al. | 701/96 |
| 6,832,157 B2 * | 12/2004 | Egami | 701/301 |
| 6,850,628 B2 | 2/2005 | Shirato | 382/104 |
| 6,853,884 B2 * | 2/2005 | Sadano | 340/435 |
| 7,049,945 B2 * | 5/2006 | Breed et al. | 340/436 |
| 7,091,838 B2 * | 8/2006 | Shimakage | 340/436 |
| 7,216,023 B2 * | 5/2007 | Akita | 701/41 |

OTHER PUBLICATIONS

Nagpal J. Gogia S: "Racecadotril." *Indian Pediatr*. 2004: 1218-1224.
Takeyama K, Minato H, Fukuya F, Kawahara S, Hosoki K, Kadodawa T: Antihypertensive activity of alacepril, an orally active angiotensin converting enzyme inhibitor, in renal hypertensive rats and dogs. *Arzneimittelforschung* 1985;10: 1502-1507.
Trapani AJ, Beil ME, Bruseo CW, Fink CA, Hoyer D, Savage P, Jeng AY: "Effects of the ECE/NEP inhibitor CGS 34225 on the big peptide concentration in conscious rats." *Clin. Sci.* 2002; 103(Suppl. 48): 1025-1065.

* cited by examiner

*Primary Examiner*—Davetta W. Goins

(57) ABSTRACT

A lane monitoring system deployed on a vehicle is provided for monitoring the position of the vehicle relative to a lane in which the vehicle is traveling. The system comprises a front camera for capturing front lane image data relating to an area substantially to the front of the vehicle and a rear camera for capturing rear lane image data relating to an area substantially to the rear of the vehicle. A processor is coupled to the front camera and the rear camera and is configured to receive the front lane image data and the rear lane image data. The processor is further configured to determine the position of the vehicle relative to the lane boundary from (1) the front lane image data when the front camera is operational, and (2) the rear lane image data when the front camera is not operational and the rear camera is operational.

14 Claims, 4 Drawing Sheets

VEHICULAR LANE MONITORING SYSTEM UTILIZING FRONT AND REAR CAMERAS

TECHNICAL FIELD

The present invention relates generally to a lane monitoring system for use in a vehicle and, more particularly, to a vehicular lane keeping and departure warning system utilizing front and rear cameras.

BACKGROUND OF THE INVENTION

In recent years, it has become fairly common to find one or more cameras deployed on a vehicle and utilized in any one of a number of applications. For example, a camera may be mounted proximate the rear of a vehicle and coupled to a display that generates images of the vehicle's rearward path to which a driver may refer when backing-up to avoid collision with a rear obstacle. Cameras have also recently been employed in lane monitoring systems that determine if a vehicle is drifting (e.g., straying or departing) from the lane in which it is traveling. When it is determined that a vehicle has drifted from its desired lane position (e.g., from the center of the lane) by a predetermined amount, the lane monitoring system may: (1) alert the driver of this condition (commonly referred to as a lane departure warning function), and/or (2) actively direct the vehicle back toward the center of the lane (commonly referred to as a vehicle heading correction or lane keeping assist function).

Lane monitoring systems configured to provide a lane departure warning (LDW) function generally employ a frontward-looking (or downward-looking) camera, a processor, and an alert generator. The processor receives lane image data from the frontward-looking camera to determine the location of lane markers, and thus the lateral boundaries of the lane, relative the vehicle. If it is determined that the vehicle is drifting too far from the center of its lane (or if the distance between the vehicle and the lane markers has exceeded a minimum threshold value), the lane monitoring system causes an alert to be generated (e.g., an audible or visual alert), which may vary in relation to the degree of drift. This alert may include a haptic alert (e.g., a seat vibration) designed to prompt the driver into performing an appropriate lane correction. One known lane monitoring system, for example, utilizes an actuator coupled to the vehicle's steering wheel to provide a driver with the tactile impression that his or her vehicle is traveling along an elongated groove with sloping sidewalls running within the lane.

Lane monitoring systems configured to provide a lane keeping assist (LKA) function (i.e., configured to perform vehicle heading corrections when lane drifting becomes too severe to actively direct a vehicle back toward the center of its lane) typically comprise a frontward-looking (or downward-looking) camera, an actuator coupled to the vehicle's steering wheel, a plurality of sensors (e.g., steering wheel angle sensor, vehicle speed sensor, etc.), and a processor that determines a target steering wheel angle from lane image data provided by the camera and from other data provided by the plurality of sensors (e.g., vehicle speed, lateral acceleration, road curvature, yaw angle, etc.). If the actual steering wheel angle differs from the target steering wheel angle by a threshold amount, the processor commands the actuator coupled to the steering wheel to apply an appropriate amount of torque to correct the discrepancy (i.e., perform a vehicle heading correction) and thus direct the vehicle back toward the desired lane position.

Existing lane monitoring systems employing one or more frontward-looking (or down-ward looking) cameras may be unable to effectively operate under poor visibility conditions (e.g., rain, snow, fog, etc.). Perhaps even more problematically, the cameras employed by existing lane monitoring systems may be temporarily blinded by direct sunlight exposure. Thus, existing systems may not perform properly when the vehicle is being driven in the general direction of the sun and there exists a low sun angle (e.g., the sun is relatively close to the horizon as during sunrise or sunset). Systems employing forward-looking stereo-camera assemblies or multiple downward-looking cameras are relatively complex and expensive to employ.

Considering the above, it should be appreciated that it would be desirable to provide a lane monitoring system having lane departure warning and/or lane keeping assist functions that is capable of operating more effectively under normal driving conditions in general and under poor visibility/ direct sunlight conditions in particular. It should further be appreciated that it would be desirable that the implementation costs associated with such systems be minimized by, for example, utilizing components (e.g., rearward-looking cameras) currently deployed on a vehicle. Furthermore, other desirable features and functions of the present invention will become apparent from the subsequent detailed description of the invention and the appended claims, taken in conjunction with the accompanying drawings and this background of the invention.

SUMMARY OF THE INVENTION

A lane monitoring system deployed on a vehicle is provided for monitoring the position of the vehicle relative to a lane in which the vehicle is traveling. The system comprises a front camera mounted on the vehicle for capturing front lane image data relating to an area substantially to the front of the vehicle and a rear camera also mounted on the vehicle for capturing rear lane image data relating to an area substantially to the rear of the vehicle. A processor is coupled to the front camera and to the rear camera and is configured to receive the front lane image data and the rear lane image data. The processor is further configured to determine the position of the vehicle relative to the lane from (1) the front lane image data when the front camera is operational, and (2) the rear lane image data when the front camera is not operational and the rear camera is operational.

A method for monitoring the position of a vehicle relative to a lane in which the vehicle is traveling is also provided. The vehicle includes a processor, a front camera, and a rear camera, and the method comprises capturing front lane image data relating to an area substantially to the front of the vehicle with the front camera, and capturing rear lane image data relating to an area substantially to the rear of the vehicle with the rear camera. The method further comprises determining the position of the vehicle relative to the lane with (1) front lane image data when the front camera is operational, and (2) rear lane image data when the front camera is not operational.

DESCRIPTION OF THE DRAWINGS

The present invention will hereinafter be described in conjunction with the following figures, wherein like reference numerals denote like elements, and.

DESCRIPTION OF AN EXEMPLARY EMBODIMENT

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
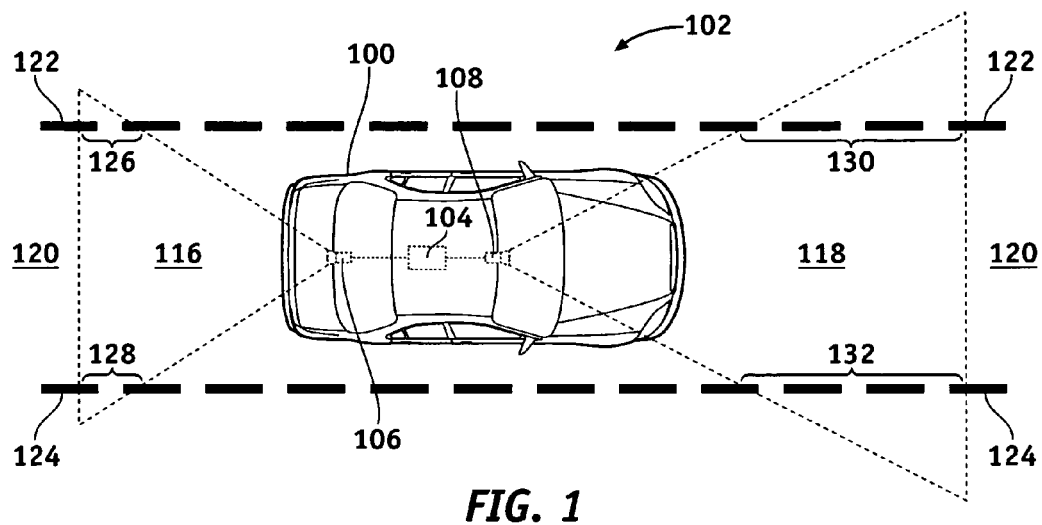
FIG. 1 is a top view of a vehicle equipped with an exemplary embodiment of the inventive lane monitoring system.

FIG. 1 is a top view of a vehicle 100 traveling in a lane 120 and equipped with an exemplary embodiment 102 of the inventive lane monitoring system. Exemplary lane monitoring system 102 comprises a processor 104, a rearward-looking camera 106, and a frontward-looking camera 108. Cameras 106 and 108 are coupled to processor 104 and relay thereto lane image data relating to a rear visual detection field 116 and a front visual detection field 118, respectively. When vehicle 100 is traveling in lane 120, which may be defined at its lateral boundaries by two parallel series of lane markers 122 and 124, processor 104 may use the rear lane image data provided by camera 106 and/or the front lane image data provided by camera 108 to identify markers 122 and 124 and subsequently establish the position of vehicle 100 within lane 120 in a well-known manner (for a more detailed explanation of this process, see U.S. Pat. No. 6,850,628 entitled "Lane Recognition Apparatus for Vehicle" issued Feb. 1, 2005 and assigned to Nissan Motor Co., Ltd.). In the example illustrated in FIG. 1 specifically, processor 104 may utilize lane image data of rear visual detection field 116 provided by camera 106 to identify markers 122 and 124 at regions 126 and 128, respectively, and lane image data of front visual detection field 118 provided by camera 108 to identify markers 122 and 124 at regions 130 and 132, respectively.

Figure 2:
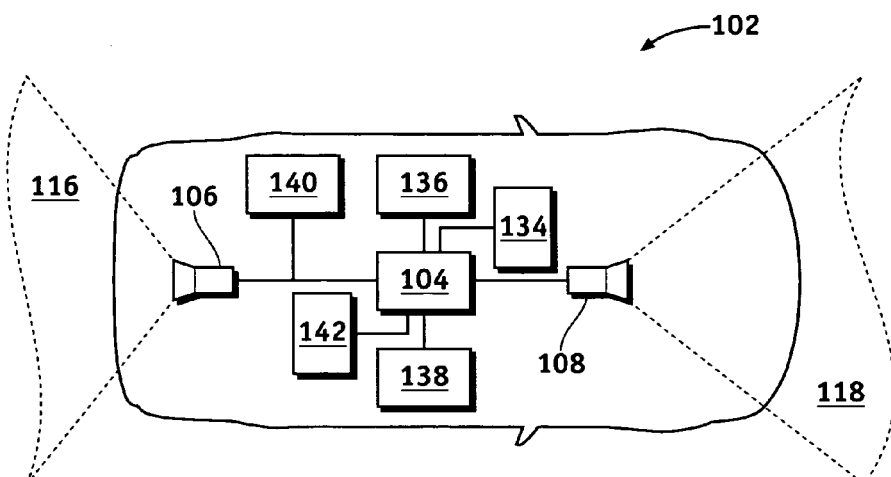
FIG. 2 is a functional block diagram of the exemplary embodiment of the lane monitoring system.

FIG. 2 is a more detailed functional block diagram of lane monitoring system 102 shown in FIG. 1. System 102 further comprises a vehicle heading correction device (e.g., a steering wheel actuator) 134, a steering wheel angle sensor 136, a vehicle speed sensor 138, and an alert generator 142, all of which may be coupled to processor 104 (e.g., by way of a serial data line). These components may perform the following functions. Vehicle speed sensor 138 relays information to processor 104 indicative of the current speed of vehicle 100, which it may derive, for example, by monitoring the rotational frequency of one or more wheels of vehicle 100. Steering wheel angle sensor 136 periodically provides processor 104 with the angular position of steering wheel of vehicle 100 that processor 104 utilizes to project the path of vehicle 100 or to determine if a driver is actively steering vehicle 100 in the manner described below in conjunction with FIG. 3. Steering wheel actuator 134 may, under the control of processor 104, physically adjust the steering wheel of vehicle 100 to perform vehicle heading corrections that are deemed necessary by processor 104 in accordance with a suitable lane keeping method as will be more fully described below. If desired, steering wheel actuator 134 may also be configured to provide a driver of vehicle 100 with tactile feedback (e.g., to create an impression that vehicle 100 is traveling along an elongated groove with sloping sidewalls running within lane 120). Lastly, alert generator 142 may generate visual alerts, audible alerts, and/or haptic alerts (e.g., brake pulses or seat vibrations), as will also be more fully described below.

As shown in FIG. 2, a display 140 may also be coupled to processor 104 to display rear lane image data captured by rearward-looking camera 106 when vehicle 100 is traveling in reverse and thus provide a driver of vehicle 100 with an improved view of the rearward path and any obstacles therein. If desired, display 140 may be utilized to display visual warnings in accordance with lane departure warning (LDW) and/or lane keeping assist (LKA) functions described below. However, it should be understood that alert generator 142 may also comprise a display and may thus issue any desired visual alerts. This notwithstanding, display 140 is included in FIG. 2 to emphasize that rearward-looking camera 106 may be of the type utilized in a known rearward path vision system and may therefore already be deployed on vehicle 100. By utilizing a camera (or cameras) pre-existing on vehicle 100, the cost of implementing system 102 may be decreased. Lane monitoring system 102 may effectively share camera 106 with a rearward path vision system because the systems typically operate under mutually exclusive driving conditions; that is, lane monitoring system 102 typically only operates when vehicle 100 is traveling forward, and a rearward path vision system typically only operates when vehicle 100 is traveling backward.

Figure 3:
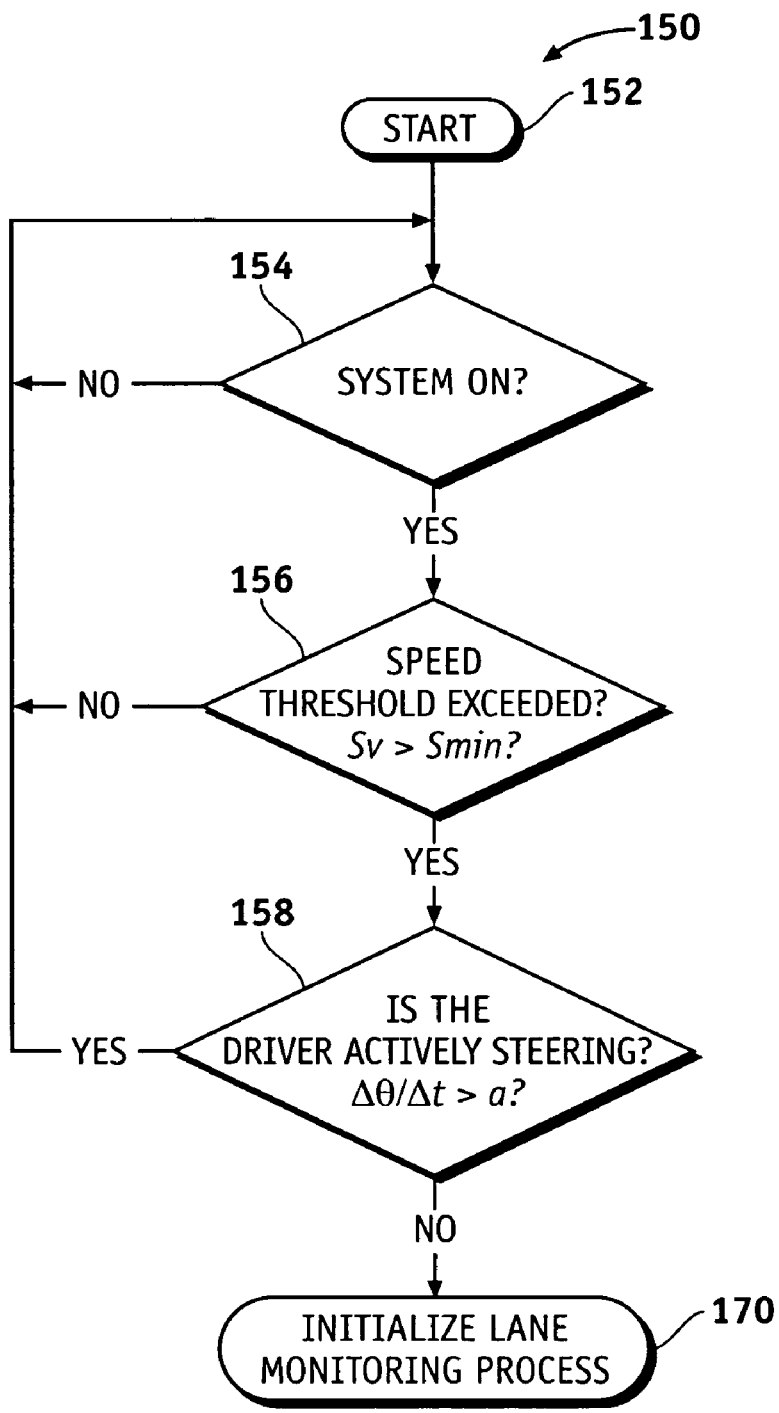
FIGS. 3-5 are flowcharts illustrating an exemplary inventive method for processing lane image data provided by front and rear vehicular cameras to generate lane departure warnings and perform lane keeping assist functions.
Figure 4:
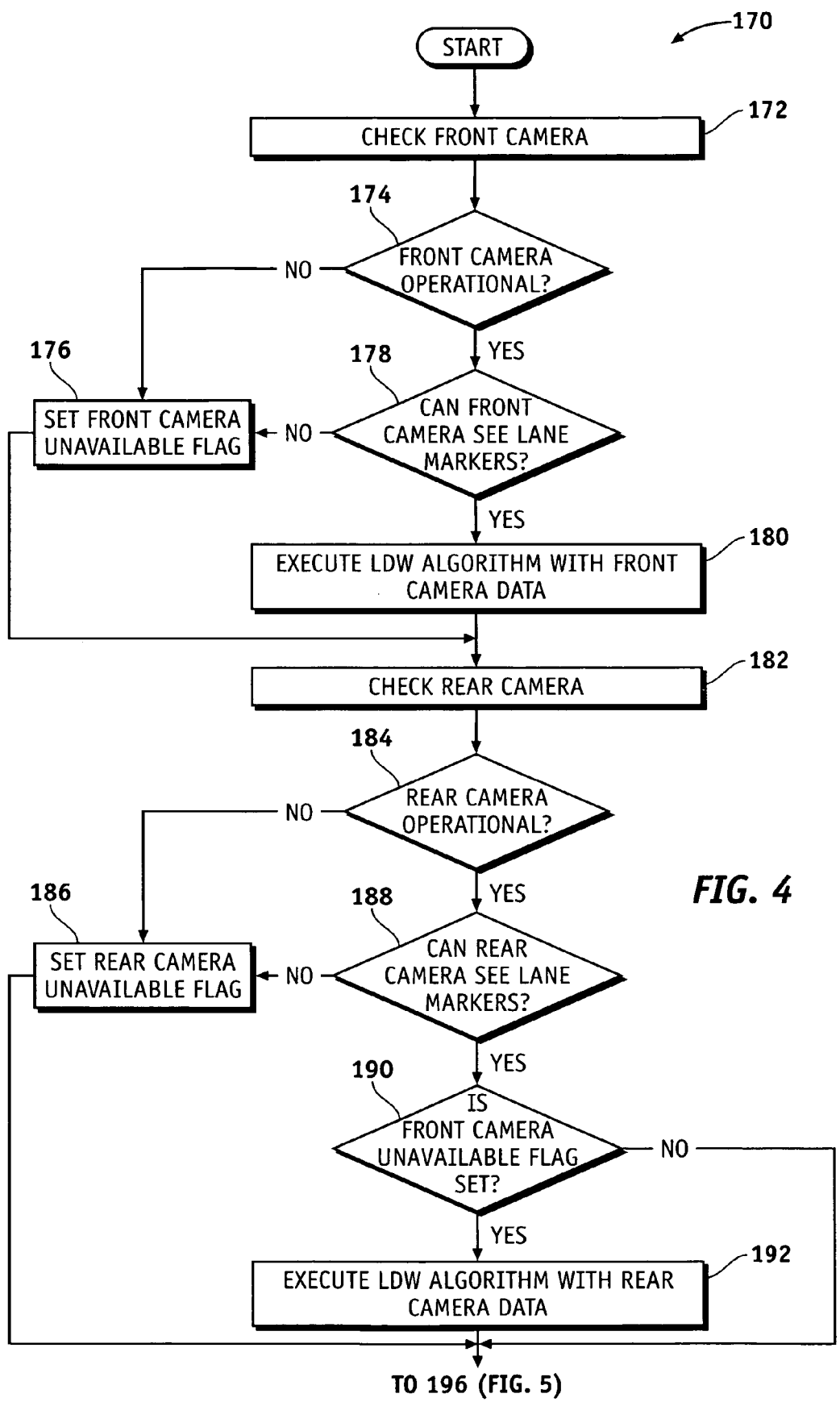
Figure 5:
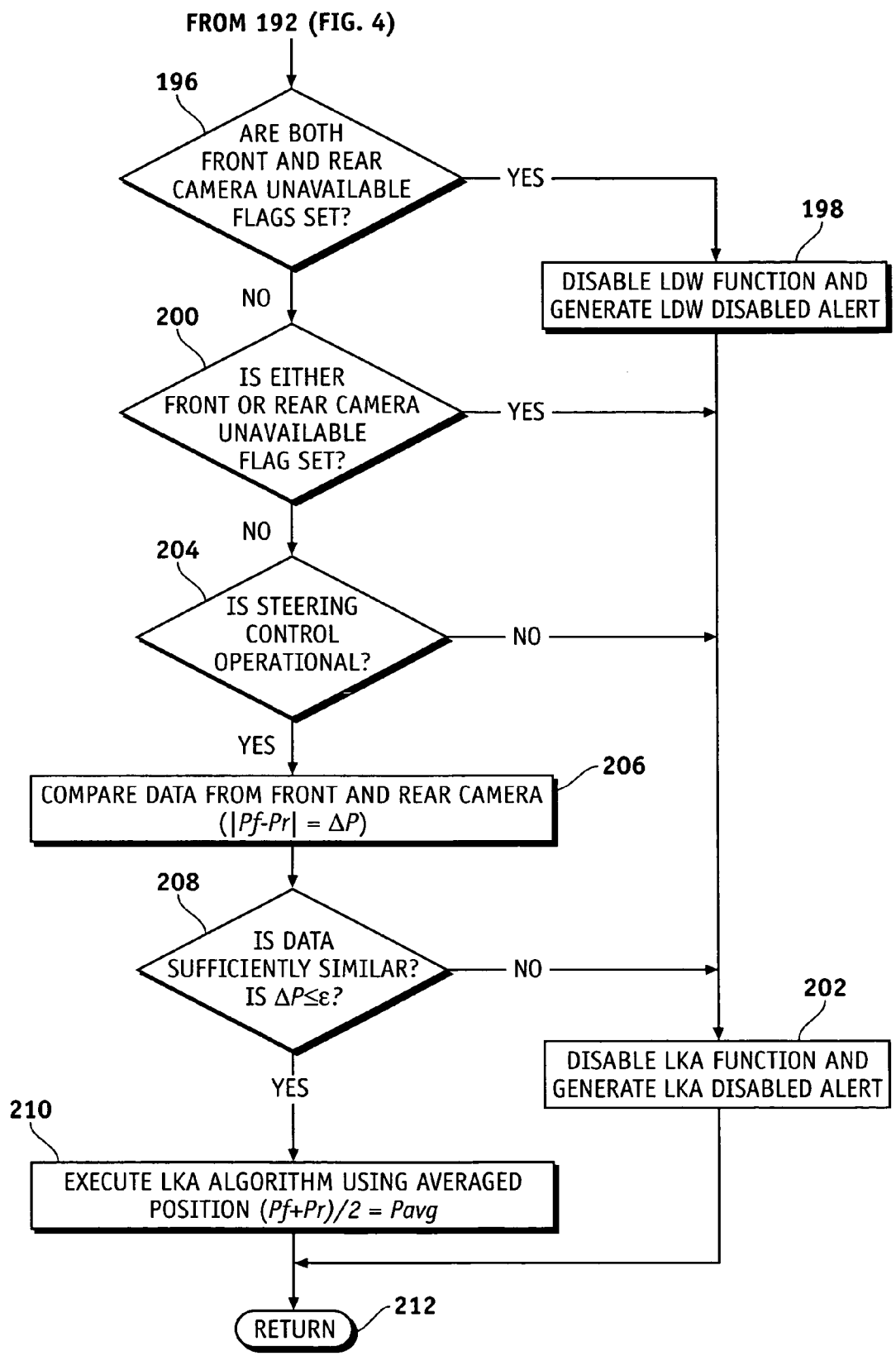

FIGS. 3-5 are flowcharts that collectively illustrate an exemplary lane monitoring method that system 102 (FIGS. 1 and 2) may utilize to selectively execute LDW and LKA functions. As will be seen, system 102 determines whether to utilize lane image data provided by rearward-looking camera 106, forward-looking camera 108, or both cameras 106 and 108 when executing LDW and LKA functions. In the exemplary embodiment specifically, lane image data from either front camera 108 (the default camera) or rear camera 106 is utilized when executing LDW functions, and lane image data from both front camera 108 and rear camera 106 is utilized when executing LKA functions. Furthermore, the exemplary method will not execute LDW functions when both camera 106 and camera 108 are unable to see (i.e., both cameras are not operational, both cameras cannot adequately see the lane markers, or one camera is not operational and the other cannot adequately see the lane markers). In contrast, the exemplary method will not execute LKA functions when either camera 106 or camera 108 cannot see (i.e., either camera is not operational or either camera cannot adequately see the lane markers), or when the lane image data provided by camera 106 is too dissimilar to that provided by camera 108. By utilizing lane image data provided by rear camera 106 in conjunction with, or as alternative to, the data provided by front camera 108, the inventive lane monitoring system may perform more accurately under both normal and poor visibility driving conditions. Furthermore, the inventive lane monitoring system may perform LDW functions despite blindness in either the front or rear camera (e.g., due to direct sunlight exposure).

The exemplary method begins with an initialization routine 150 shown in FIG. 3. After initialization (step 152) of the exemplary method, processor 104 determines whether lane monitoring system 102 (FIGS. 1 and 2) is currently activated or switched on (step 154). If system 102 is switched on, processor 104 determines the speed at which vehicle 100 is currently traveling ($S_v$) from vehicle speed sensor 138 (FIG. 2) and compares this speed to a minimum threshold speed ($S_{MIN}$) as is shown at step 156. The threshold speed may be, for example, 35 mph. By including a speed threshold in the method, LDW and LKA functions are prevented from being executed when vehicle 100 is moving at low rate of speed and thus likely traveling along a residential street, a dirt road, a parking lot, or the like that does not have defined lanes.

If processor 104 determines that vehicular speed is less than the threshold speed, initialization routine 150 is repeated. Conversely, if vehicle 100 is traveling at a speed ($S_v$) that is greater than the minimum threshold speed ($S_{MIN}$), processor 104 utilizes data provided by steering wheel angle sensor 136 (FIG. 2) and a clock to determine whether the change in steering wheel angle over a given period of time ($\Delta\theta/\Delta t$) exceeds a threshold value ($\alpha$) as indicated in FIG. 3 at step 158. If the rate of steering wheel angle change is greater than the threshold value, it is assumed that the driver is actively steering vehicle 100 and routine 150 is repeated. If, however, the rate of angle change ($\Delta\theta/\Delta t$) is less than or equal to the threshold value ($\alpha$), it is assumed that the driver is not actively steering vehicle 100 and therefore that any lane drifting is unintentional. In this case, a lane monitoring process is performed, such as the exemplary lane monitoring process described below conjunction with FIGS. 4 and 5.

As shown in FIG. 4, exemplary lane monitoring process 170 begins as processor 104 determines if front camera 108 (FIGS. 1 and 2), and any equipment associated with camera 108, is operating properly (step 172). If processor 104 determines that camera 108 is not operating properly (step 174), a FRONT CAMERA UNAVAILABLE flag is set as shown at step 176. As will be seen, setting this flag will ultimately result in the execution of a LDW algorithm utilizing rear lane image data provided by rearward-looking camera 106 (FIGS. 1 and 2) unless camera 106 is not operating properly or cannot adequately see lane markers 122 and 124 (FIG. 1). However, if processor 104 determines that front camera 108 is properly operating, processor 104 processes the front lane image data provided by front camera 108 (FIGS. 1 and 2) to determine whether camera 108 can adequately detect lane markers 122 and 124 (FIG. 1) as shown at step 178. If processor 104 determines that camera 108 cannot adequately see the lane markers, the FRONT CAMERA UNAVAILABLE flag is set. Conversely, if processor 104 determines that camera 108 can adequately see the lane markers, a suitable LDW algorithm is performed utilizing the front lane image data provided by front camera 108 (step 180). Very generally, in performing such a lane departure warning method, processor 104 processes the lane image data to establish the position of vehicle 100 relative to lane 120 and causes alert generator 142 (FIG. 2) to issue an alert if and when vehicle 100 has drifted from a desired lane position by more than a predetermined amount (e.g., if the distance separating vehicle 100 from the center of lane 120 exceeds a maximum threshold value, or if the distance separating vehicle 100 from the closest lateral boundary of lane 120 drops below a minimum threshold value). LDW algorithms/systems suitable for this purpose are known, and the interested reader is referred to U.S. Pat. No. 6,226,592 entitled "Method and Apparatus for Prompting a Motor Vehicle Operator to Remain within a Lane" issued May 1, 2001 and assigned to Veridian ERIM International, Inc.

After a LDW algorithm has been executed (step 180) or a FRONT CAMERA UNAVAILABLE flag has been set (step 176), processor 104 checks rear camera 106 (FIGS. 1 and 2), and any equipment associated therewith, for proper operation as indicated at step 182. If processor 104 determines that camera 106 is not operating properly (step 184), a REAR CAMERA UNAVAILABLE flag is set. Conversely, if camera 106 is properly operating, processor 104 processes the rear lane image data provided by rear camera 106 (FIGS. 1 and 2) to determine whether camera 106 can adequately see lane markers 122 and 124 (FIG. 1) as indicated at step 188. If processor 104 establishes that camera 106 cannot adequately detect the lane markers, a REAR CAMERA UNAVAILABLE flag is set (step 186). If processor 104 determines that camera 106 can see, however, processor 104 checks the state of the FRONT CAMERA UNAVAILABLE flag (step 190). If processor 104 determines that FRONT CAMERA UNAVAILABLE flag is set, and thus that a LDW algorithm has not yet been performed during this iteration of process 170, processor 104 executes a LDW algorithm as described above utilizing rear lane image data provided by rear camera 106 as indicated in FIG. 4 at step 192. In contrast, if processor 104 determines that the FRONT CAMERA UNAVAILABLE flag is not set, and therefore that a LDW algorithm has already been performed utilizing lane image data provided by front camera 108 (see step 180), the method proceeds to step 196 shown in FIG. 5.

In step 196 shown in FIG. 5, processor 104 determines if both the FRONT CAMERA UNAVAILABLE flag (see step 176 in FIG. 4) and the REAR CAMERA UNAVAILABLE flag (see step 186 in FIG. 4) are set (step 196). If both of these flags are in fact set, processor 104 disables the LDW function (e.g., discontinues any alerts indicating lane drifting currently being generated by alert generator 142 shown in FIG. 2) and causes alert generator 142 to generate an alert (e.g., a text message) indicating that the LDW function has been disabled as indicated at step 198. If processor 104 determines that both flags are not set, however, processor 104 determines if either the FRONT CAMERA UNAVAILABLE flag or the REAR CAMERA UNAVAILABLE flag is set (step 200). If either flag is set, processor 104 disables the LKA function (e.g., discontinues any vehicle heading corrections still being performed) and causes alert generator 142 (FIG. 2) to generate a corresponding alert (e.g., a text message generated on a display) as indicated at step 202. In contrast, if processor 104 establishes that neither the FRONT CAMERA UNAVAILABLE flag nor the REAR CAMERA UNAVAILABLE flag is set, processor 104 determines whether the steering control mechanism of vehicle 100 (e.g., steering wheel angle sensor 136 and steering wheel actuator 134 shown in FIG. 2) is operational as indicated at step 204. If the steering control mechanism is not operational, the LKA function is disabled and an LKA disabled alert is generated in the manner described above (step 202). If, however, processor 104 determines that the steering wheel control mechanism is operational, processor 104 compares the lane image data relating to front visual detection field 118 provided by front camera 108 to the lane image data relating to rear detection field 116 provided by rear camera 106.

After it is determined that the steering control mechanism is operating properly (step 204), processor 104 may calculate the absolute value of the difference between the position of vehicle 100 as derived from lane image data provided by front camera 108 ($P_F$) and the position of vehicle 100 as derived from lane image data provided by rear camera 106 ($P_R$) to determine a position differential ($\Delta P$) as indicated in FIG. 5 at step 206. Afterwards, processor 104 may compare this position differential ($\Delta P$) to a threshold differential value ($\epsilon$) as indicated at step 208. The threshold differential value may be, for example, a predetermined distance (e.g., 2 meters) or a function of lane width (e.g., ¼ or ⅛ the width of lane 120). By comparing the position differential to the threshold differential value, processor 104 determines whether or not the lane image data provided by the two cameras is sufficiently similar to reliably implement vehicle heading corrections. Thus, if the position differential is greater than the threshold differential value, a LKA algorithm is not executed. If, however, processor 104 determines that position differential ($\Delta P$) is less than or equal to the threshold differential value ($\epsilon$), processor 104 performs a known LKA algorithm utilizing an estimated position of vehicle 100 ($P_{AVG}$) as indicated in FIG. 5 at step 210. Processor 104 may calculate an estimated position of vehicle 100 by averaging the vehicular position derived from front lane image data provided by front camera 108 ($P_F$) and the vehicular position derived from rear lane image data provided by rear camera 106 ($P_R$). During the performance of a LKA algorithm, processor 104 may utilized this estimated vehicular position ($P_{AVG}$) to establish whether vehicle 100 has crossed over lane markers 122 or lane markers 124 and, if vehicle 100 has done so, determine the magnitude and sign of an appropriate vehicle heading correction to return vehicle 100 to its desired lane position. The vehicle heading correction may then be applied by way of a proportional and integral (ramp) control (e.g., via steering wheel actuator 134 shown in FIG. 2). LKA algorithms/systems suitable for this process are known in the art. An exemplary LKA algorithm/system is described in U.S. Pat. No. 6,489,887 entitled "Lane-Keep Assisting System for Vehicle" issued Dec. 3, 2002 and assigned to Nissan Motor Co., Ltd. After processor 104 performs a suitable LKA algorithm and any needed vehicle heading corrections are made (step 210), or after processor 104 disables the LKA function and a corresponding alert is generated (step 202), the exemplary lane monitoring method is repeated.

It should thus be appreciated from the foregoing that there has been provided a lane monitoring system having lane departure warning and/or lane keeping assist functions that is capable of operating more effectively under normal driving conditions in general and under poor visibility/direct sunlight conditions in particular. It should further be appreciated that a system has been provided that may decrease implementation costs by utilizing components (e.g., rearward-looking cameras) with which many vehicles are already equipped.

While a limited number of exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. Various changes can be made in the function and arrangement of elements without departing from the scope of the invention as set forth in the appended claims and the legal equivalents thereof.

What is claimed is:

1. A lane monitoring system deployed on a vehicle for monitoring the position of the vehicle relative to a lane in which the vehicle is traveling, the system comprising:
   a front camera mounted on the vehicle for capturing front lane image data relating to an area substantially to the front of the vehicle;
   a rear camera mounted on the vehicle for capturing rear lane image data relating to an area substantially to the rear of the vehicle;
   a vehicle heading correction device for steering the vehicle; and
   a processor coupled to said vehicle heading correction device, said front camera, and said rear camera for receiving said front lane image data and said rear lane image data, said processor configured to determine the position of the vehicle relative to the lane from said front lane image data and from said rear lane image data when said front camera and said rear camera are operational, said processor further configured to cause said vehicle heading correction device to perform a vehicle heading correction when the vehicle drifts form a desired lane position by more than a predetermined amount and only when a first lane position derived from said front lane image data differs from a second lane position derived from said rear lane image data by less than a predetermined amount.

2. A lane monitoring system according to claim 1 further comprising an alert generator coupled to said processor, said processor configured to cause the generation of an alert when the vehicle has drifted from a desired lane position by a predetermined amount.

3. A lane monitoring system according to claim 2 wherein the lane includes lane boundaries and wherein said processor determines the lane position from said front lane image data only when said front camera can adequately detect the lane boundaries, and from said rear lane image data only when said rear camera can adequately detect the lane boundaries.

4. A lane monitoring system according to claim 1 wherein the vehicle heading correction occurs only when said front camera and said rear camera can adequately detect the lane boundaries.

5. A lane monitoring system according to claim 1 wherein said processor determines the lane position by averaging a first lane position derived from said front lane image data and a second lane position derived from said rear lane image data.

6. A lane monitoring system according to claim 1 wherein said processor determines vehicle position only when the speed of the vehicle is greater than a predetermined speed.

7. A lane monitoring system according to claim 1 wherein said processor determines vehicle position only when a driver is not actively steering the vehicle.

8. A method for monitoring the position of a vehicle relative to a lane in which the vehicle is traveling, the vehicle including a processor, a front camera, a rear camera, and a heading correction device coupled to the processor, the method comprising:
   capturing front lane image data relating to an area substantially to the front of the vehicle with the front camera;
   capturing rear lane image data relating to an area substantially to the rear of the vehicle with the rear camera;
   determining the position of the vehicle relative to the lane from the front lane image data and from the rear lane image data when the front camera and the rear camera are operational; and
   performing a vehicle heading correction when the vehicle lane position has drifted from a desired lane position by more than a predetermined amount, the vehicle lane position determined, at least in part, by averaging a first lane position derived from the front lane image data with a second lane position derived from the rear lane image data.

9. A method according to claim 8 wherein the vehicle includes an alert generator and the method further comprises generating an alert when the vehicle has drifted from a desired lane position by more than predetermined amount.

10. A method according to claim 8 further comprising comparing a first lane position derived from the front lane image data to a second lane position derived from the rear lane image data and performing a vehicle heading correction only when the first position differs from the second position by a less than predetermined amount.

11. A method according to claim 8 further comprising measuring the speed of the vehicle, establishing if a driver is actively steering the vehicle, and determining the lane position only when the speed of the vehicle is greater than a predetermined amount and the driver is not actively steering.

12. A lane monitoring system deployed on a vehicle for monitoring the position of the vehicle relative to a lane in which the vehicle is traveling, the system comprising:

- a front camera mounted on the vehicle for capturing front lane image data relating to an area substantially to the front of the vehicle;
- a rear camera mounted on the vehicle for capturing rear lane image data relating to an area substantially to the rear of the vehicle;
- a vehicle heading correction means for directing the vehicle; an alert generator; and
- a processor coupled to said front camera, said rear camera, said vehicle heading correction means, and said alert generator, said processor configured (1) to generate an alert when the vehicle is out of lane position by more than a first predetermined amount, the lane position being derived from said front lane image data when said front camera is operational and from said rear lane image data when said front camera is not operational, and (2) to perform a vehicle heading correction when the vehicle is out of lane position by more than a second predetermined amount, the lane position being derived from said front lane image data and said rear lane image data.

13. A lane monitoring system according to claim 12 wherein said processor is configured to generate an alert only when at least one of said front camera and said rear camera can adequately detect the boundaries of the lane, and to perform a vehicle heading correction only when said front camera and said rear camera can adequately detect said boundaries.

14. A lane monitoring system according to claim 12 wherein the system monitors lane position only when a driver is not actively steering the vehicle and when the speed of the vehicle is greater than a predetermined speed.

* * * * *